INVENTOR.
ERNST ANTON

United States Patent Office 3,346,551
Patented Oct. 10, 1967

3,346,551
CRYSTALLINE MODIFICATIONS OF PERYLENE-3,4,9,10-TETRACARBOXYLIC ACID BIS-(4-PHENYLAZO)-PHENYLIMIDE
Ernst Anton, Ludwigshafen (Rhine), Germany, assignor to Badische Anilin- und Soda-Fabrik Aktiengesellschaft, Ludwigshafen (Rhine), Germany
Filed Aug. 14, 1963, Ser. No. 302,141
Claims priority, application Germany, Aug. 16, 1962, B 68,460
3 Claims. (Cl. 260—152)

Many red pigment dyes which fulfill exacting requirements as regards fastness properties and which are distinguished by outstanding plasticizer and solvent fastness and also by good light fastness are already known as organic pigments. Not all such red pigment dyes satisfy in the same degree the requirement for a high brilliance of their colorations. There is therefore a demand for red pigment dyes which in addition to good fastness properties will exhibit the particularly desirable high brilliance.

This invention relates to two red pigment dyes of the perylene-3,4,9,10-tetracarboxylic diimide series which exhibit good fastness and high brilliance. These two pigment dyes are two different new modifications, namely the α- and β-modifications, of the brown red perylene-3,4,9,10-tetracarboxylic acid bis-[(4-phenylazo)-phenylimide] having the formula:

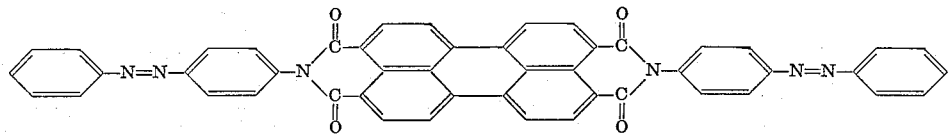

known from French patent specification No. 1,223,392. The invention also relates to the production of these new pigments and to materials and mixtures colored therewith.

Figure 1:
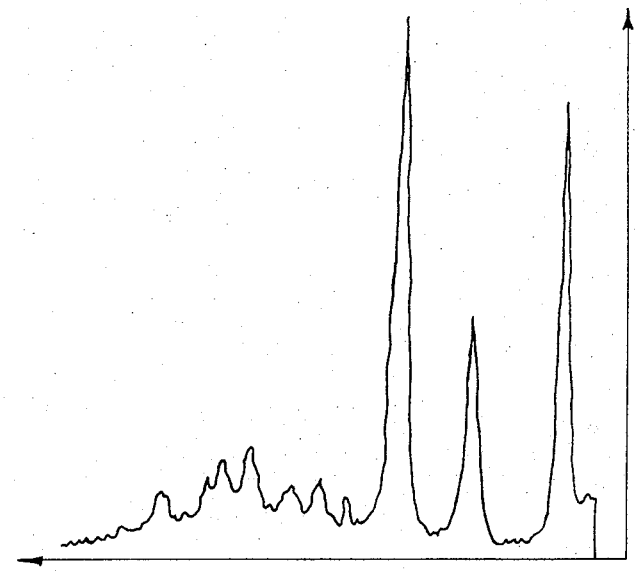

The α-modification of perylene-3,4,9,10-tetracarboxylic acid bis-[(4-phenylazo)-phenylimide] which is very suitable for the new pigmented materials and mixtures is characterized in its X-ray diffraction pattern (see FIGURE 1 of the accompanying drawing) by two lines of strong intensity at a double glancing angle of 5.1° and 14.7°, one line of medium intensity at 10.5° and nine lines of weak intensity at 17.7°, 19.4°, 21.2°, 22.3°, 23.6°, 25.4°, 26.0°, 27.4° and 29.0°. The pigment of this α-modification has a blush red tinge and has very good general fastness properties and it is distinguished particularly by outstanding light and weathering fastness and resistance to high temperature and is not affected by chemical compounds such as solvents and plasticizers. It has a mean primary particle size of 4 to 10 microns and high color strength and brilliance.

Figure 2:
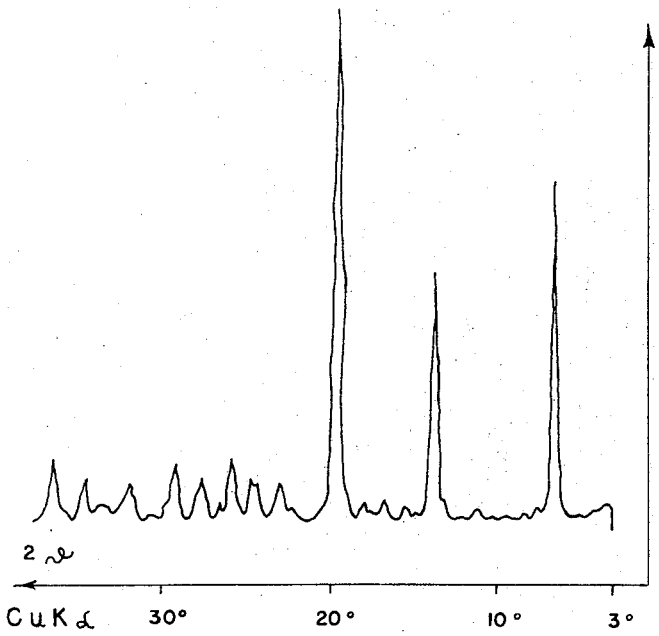

The β-modification of perylene-3,4,9,10-tetracarboxylic acid bis-[(4-phenylazo)-phenylimide] which is outstandingly suitable for the new pigmented materials and mixtures is characterized in its X-ray diffraction pattern (see FIGURE 2 of the accompanying drawing) by two lines of strong intensity at a double glancing angle of 6.5° and 19.3°, one line of medium intensity at 13.5° and sixteen lines of weak intensity at 7.4°, 11.0°, 13.0°, 15.2°, 16.4°, 17.8°, 22.0°, 22.7°, 24.1°, 24.3°, 25.0°, 25.6°, 26.2°, 27.3°, 27.7° and 28.8°. The pigment of this β-modification has very good general fastness properties. Like the pigment of the α-modification it is distinguished by outstanding light and weathering fastness and resistance to high temperature and is not attacked by chemical compounds, such as solvents and plasticizers, but is superior to the α-modification in brilliance. At a mean primary particle size of 1 to 4 microns it has good color strength and high brilliance and a shade clearly displaced toward yellow as compared with the α-modification.

The X-ray diffraction patterns herein described were taken with a counter X-ray spectrometer known under the trademark "Norelco," CuK alpha radiation, 40 kv., 20 ma.; angular aperture 1°; tube scanning speed ¼° per minute. The terms "strong intensity," "medium intensity" and "weak intensity" used in this specification indicate the relative size relationships. The line with the highest intensity is given the value 100. Lines having a peak above 50 are defined as strong, those having a peak between 25 and 50 as medium, and those having a peak below 25 as weak.

The X-ray diffraction patterns are shown in the accompanying drawing.

Pigmented mixtures which contain pigments of α- or β-modification according to this invention, if desired with other components, may be for example flushed colors, printing inks, distempers, emulsion paints, lacquers, varnishes and enamels of all kinds, such as those which dry physically or oxidatively, acid-curing, amine-curing or peroxide-curing lacquers or polyurethane coating compositions, particularly automotive finishes. The pigment may also be present in such materials as synthetic, semi-synthetic or natural macromolecular substances, e.g. polyvinyl chloride, polystyrene, polyethylene, polyesters, phenoplasts, aminoplasts and rubber. The pigment may also be contained in natural, regenerated or synthetic fibers, such as glass, silicate, asbestos, wood, cellulose, acetylcellulose, polyacrylonitrile, polyester, polyurethane and polyvinyl chloride fibers or mixtures thereof, and also in powders, for example organic or inorganic pigments, stone powder, cements, gypsum, starches and wood flour. Prints, lacquerings, paints, coatings, molded articles, such as sheets, filaments, threads, boards, blocks, granulates and rods having brilliant color of outstanding durability are obtained.

Pigmented mixtures which contain as the active coloring constituents the brilliant red pigment of α- or β-modification of perylene-3,4,9,10-tetracarboxylic acid bis-[(4-phenylazo)-phenylimide] may be of solid, elastic, pasty, viscous liquid, mobile liquid or thixotropic consistency. They may be obtained by conventional methods. For example for the production of flushed colors, printing inks, distempers, plastics dispersions and spinning solutions it is possible to use pigment pastes or other formulations. The pigments may however also be incorporated by stirring, rolling, kneading or grinding into water, organic solvents, non-drying oils, drying oils, lacquers, varnishes, enamels, plastics or rubber. Moreover it is possible to work the pigments into mixtures by dry mixing with organic or inorganic materials, granulates, fibrous materials, powders and other pigments.

Pigmented materials and mixtures which contain the α- or β-modifications of perylene-3,4,9,10-tetracarboxylic acid bis-[(4-phenylazo)-phenylimide] according to the invention in admixture with natural and/or synthetic resins, lacquers, varnishes, enamels, fibers, plastics, rubber, emulsion paints, printing inks, dry colors and flushed colors are of particular industrial interest.

The α-modification of perylene-3,4,9,10-tetracarboxylic acid bis-[(4-phenylazo)-phenylimide] can be obtained from the condensation product (obtainable by reaction of perylene-3,4,9,10-tetracarboxylic anhydride and 4-aminoazobenzene in boiling quinoline in the presence of zinc chloride) by dissolving it in concentrated sulfuric acid and precipitating it by adding water. It is advantageous to dissolve the dye in five to twenty times the weight of concentrated sulfuric acid, to carry out the precipitation by adding water at a temperature of 40° to 100° C., preferably 50° to 70° C., and to wash the precipitated dye with an about 80% sulfuric acid. The α-modification is thus obtained with a mean primary particle size of 4 to 10 microns.

To prepare the β-modification of perylene-3,4,9,10-tetracarboxylic acid bis-[(4-phenylazo)-phenylimide], the dye of the α-modification may be brought into contact with solvents, such as water, alcohols, hydrocarbons, halogenated or nitrated hydrocarbons, nitriles, ketones, dimethylformamide, N-methylpyrrolidone or dimethylsulfone. This may be effected by preparing a suspension by stirring the α-modification of the pigment in one to fifty times, preferably five to twenty-five times the weight of solvent at 0° to 250° C., preferably at 10° to 205° C. A size reduction of the mean particle size to 1 to 4 microns takes place during this process, and transition into the brilliant red β-modification takes place with thickening of the mixture. This transition is complete after action for about half an hour to twenty hours. Further reduction of the particle size may be effected by conventional methods, for example by the action of grinding or shearing forces, advantageously in the presence of the above-mentioned solvents, or with the addition of suitable grinding auxiliaries, for example sodium chloride.

A particularly valuable pigment is obtained when the washed and dried α-modification of the pigment (obtained by dissolving perylene -3,4,9,10-tetracarboxylic acid bis-[(4-phenylazo)-phenylimide] in sulfuric acid and depositing it from the solution by adding water at 40° to 70° C.) is mixed with five to twenty-five times the weight of dimethylformamide and the mixture is heated at 100° to 150° C. until the mean particle size is 1 to 4 microns, for which a heating period of half an hour to two hours is necessary. The same result is obtained when the water-wet and acid-free filter cake containing the α-modification of the pigment is mixed with fifteen to twenty-five times the amount of dimethylformamide and the water is removed from the mixture by distillation at atmospheric pressure. A pigment having the same nature is obtained by using N-methylpyrrolidone or dimethylsulfoxide instead of dimethylformamide.

The α- and β-modifications of perylene-3,4,9,10-tetracarboxylic acid bis-[(4-phenylazo)-phenylimide] used according to this invention are pigments of high brilliance and good general fastness. They are particularly distinguished by their outstanding resistance to plasticizers and solvents, especially by their excellent light fastness. The new pigments according to this invention differ from the dye known from French patent specification No. 1,223,392, page 2, example 8, by the pure red shade of a coloration of polyvinyl chloride and by better fastness properties, particularly by better light fastness.

The invention is illustrated by the following examples. The parts and percentages are by weight.

EXAMPLE 1

10 parts of the red pigment obtainable according to the following paragraphs (a) and (b) and 10 parts of alumina trihydrate are ground on a three-roll mill with 30 parts of linseed oil varnish to form a printing ink. When this printing ink is used in the book printing or offset printing method, brilliant red prints having very good fastness properties and particularly a very good light fastness are obtained.

(a) 20 parts of perylene-3,4,9,10-tetracarboxylic acid bis-[(4-phenylazo)-phenylimide] (obtainable by condensation of perylene-3,4,9,10-tetracarboxylic acid or its anhydride with 4-aminoazobenzene in quinoline in the presence of zinc chloride) is dissolved at 10° to 15° C. in 200 parts of concentrated sulfuric acid. 31 parts of water is allowed to flow into this solution in such a way that the temperature does not exceed 70° C. The mixture is kept for another hour at a temperature of 60° to 70° C. The whole is allowed to cool and the sulfate which has been deposited in the form of needles is filtered off with suction, washed with 81% sulfuric acid and decomposed by introduction into 200 parts of ice water. The residue is filtered off with suction and washed with water until neutral. After the water has been displaced with 50 parts of methanol, the product is dried at 80° C. in vacuo. The red pigment of perylene-3,4,9,10-tetracarboxylic acid bis-[(4-phenylazo)-phenylimide] is obtained in the α-crystal modification with a mean primary particle size of 4 to 10 microns.

(b) To prepare the pigment in the β-crystal modification, 10 parts of the pigment in the α-modification obtained according to (a) above is introduced while stirring into 100 parts of dimethylformamide and the mixture heated for two hours at 150° C. The whole is cooled to 100° C. and the residue is filtered off with suction, the filter cake washed with 40 parts of dimethylformamide, then with water and finally with methanol and dried at 60° C. under subatmospheric pressure. The pigment in the β-modification is obtained with a mean primary particle size of 1 to 4 microns.

EXAMPLE 2

A nitrocellulose stock lacquer is made from 18.9 parts of a butanol-wet nitrocellulose containing 12 parts of nitrocellulose, 4.7 parts of di-n-butyl phthalate, 3 parts of benzyl-n-butyl phthalate, 4 parts of the condensation product of cyclohexanone and methylcyclohexanone, 30 parts of butyl acetate, 10 parts of ethyl acetate and 29.4 parts of toluene.

(a) 97.5 parts of this stock lacquer is ground with 2.5 parts of the pigment in the β-crystal modification obtained according to Example 1(b) in a ball mill or a corundum disc mill. A brilliant red nitrocellulose lacquer having excellent light fastness is obtained.

(b) To obtain a light full tone, 10 parts of a lacquer obtainable according to (a) is ground with 90 parts of the nitrocellulose stock lacquer.

(c) A white lacquer is prepared from 90 parts of the nitrocellulose stock lacquer obtainable according to the first paragraph of this example and 10 parts of titanium dioxide. 1 part of this white lacquer is ground with 1 part of the nitrocellulose lacquer obtainable according to (a). A dilution with white 1:4 is obtained.

EXAMPLE 3

67 parts of a mixture consisting of 60 parts of coconut oil alkyd resin (40% of coconut oil) and 40 parts of xylene is converted into a clear lacquer with 17 parts of urea-formaldehyde resin and 16 parts of glycol acetate.

(a) 95 parts of the clear lacquer thus obtained is ground with 5 parts of the new pigment obtained according to Example 1(a) or 1(b) in a cone mill. After baking for one hour at 120° C., brilliant red lacquerings are obtained which are very resistant to weathering and over lacquering.

(b) A 1% pigmentation is obtained by grinding 9 parts of clear lacquer with 1 part of (a).

EXAMPLE 4

60 parts of polyvinyl chloride, 40 parts of di-(2-ethylhexyl)phthalate, 0.6 part of the organic tin compound obtainable in commerce under the name "Advastab 17 M" and 0.5 part of the pigment obtainable according to Example 1(b) are mixed on rolls for four minutes at 140° C. and pressed to a sheet. A brilliant red colored plastic material is obtained which may be used for the production of sheets or sections. The coloration is outstandingly light and plasticizer fast.

To achieve a composition having hiding power, 60 parts of polyvinyl chloride, 89 parts of chalk, 16 parts of titanium oxide (anatase), 35 parts of dibutyl phthalate, 1 part of the tin compound commercially available under the name "Advastab 17 M" may be colored in an analogous way with 1 part of the new pigment on mixing rolls.

EXAMPLE 5

100 parts of granulated polystyrene (suspension polymer) and 0.05 part of the pigment obtained according to Example 1(b) are drum colored and after passage through an extruder to an injection molding machine are converted into any desired molded articles. A brilliant red polymer having outstanding light fastness and excellent resistance to high temperature is obtained.

EXAMPLE 6

100 parts of high pressure polyethylene is colored with 0.05 part of the pigment obtainable according to Example 1(b) in the way described in Example 5. A red polymer is obtained.

By using 0.2 part of dye instead of 0.05 part of dye, and also 1 part of titanium dioxide (rutile), opaque colorings are obtained.

EXAMPLE 7

A rubber mixture consisting of 50 parts of pale crepe, 1.3 parts of sulfur, 0.5 part of stearic acid, 0.5 part of 2-mercaptobenzothiazole, 0.1 part of hexamethylene tetramine, 2.5 parts of zinc oxide, 30 parts of chalk and 1 part of titanium dioxide (anatase type) is colored in the usual way on mixing rolls at 50° C. with 1 part of the new pigment obtainable according to Example 1(b). A red colored vulcanization product is obtained.

EXAMPLE 8

10 parts of heavy spar is suspended in 50 parts of water with a solution of 5 parts of aluminum sulfate. A solution of 2.5 parts of sodium carbonate in 25 parts of water and 5 parts of an aqueous dye paste containing 20% of the product obtainable according to Example 1(b) is then added while stirring. A solution of 6 parts of barium chloride in 60 parts of water is then added to the mixture, the residue filtered off with suction and washed with water. 20 parts of the resultant dye paste is mixed with 4 parts of a 20% glue solution. Colorations having very good light fastness are obtained with the wallpaper color thus prepared.

EXAMPLE 9

10 parts of the red pigment obtained according to 1(a) or 1(b) is dissolved in 100 parts of 96% sulfuric acid at 10° to 20° C. The solution is poured into 1000 parts of water while stirring, a temperature of 40° to 50° C. being maintained. The residue is filtered off with suction and washed with water until free from acid. The moist filter cake is stirred with 100 to 200 parts of water to a flowable paste. The paste is heated for five hours at 150° C. in an autoclave fitted with a stirrer, then allowed to cool and 0.5 part of dodecyl alcohol is added. The mixture is stirred for another hour, filtered with suction and dried at 60° to 100° C. in vacuo or in a circulation dryer. A powdered pigment preparation is obtained from the dried product by grinding with a disc attrition mill or cross beater mill or with a disintegrator; this powdered pigment preparation may be processed by conventional methods into lacquers or printing inks, aqueous pastes for coloring wallpaper or paper, or into pigmented plastics. Transparent bluish red colorations having very high color strength are obtained. The shade is yellower and purer than the shade of colorations achieved with pigment obtained according to Example 1(b).

The procedure may also be that the moist filtered product obtainable after dissolution, reprecipitation, filtration with suction and washing until neutral, is stirred directly with an oil-soluble emulsifier, for example dodecyl alcohol, and dried. A pigment is thus obtained whose color strength is somewhat inferior to that of the pigment obtainable according to the first paragraph of this example.

EXAMPLE 10

10 parts of the red pigment obtainable according to Example 1(b) is mixed with 400 parts of dry rock salt, 400 parts of anhydrous sodium carbonate and 50 parts of o-dichlorbenzene in a rubber lined ball mill and ground with a charge of iron balls at a circumferential speed which is about two-thirds to three-quarters the critical speed. The salt is dissolved out from the mixture by dispersion in water. The residue is filtered off with suction, washed and dried at 60° to 100° C. in vacuo or in a circulation dryer. The dried product is ground in a disc attrition mill or cross beater mill or in a disintegrator. Colorations prepared with the pigment have equal color strength and transparency to the colorations obtainable with the dye according to Example 9 but are somewhat more bluish.

If grinding of the pigment is carried out with rock salt alone and o-dichlorobenzene or with sodium carbonate alone, the results obtained are not so good.

EXAMPLE 11

10 parts of the pigment obtained according to Example 1(b) is heated with 200 parts of water in an autoclave at 200° C. for twenty hours. After the whole has cooled, the residue is filtered off with suction, washed with water, then with methanol and dried at 60° C. under subatmospheric pressure. A pigment of the β-crystal modification is obtained.

I claim:

1. As a bluish red pigment dye, perylene-3,4,9,10-tetracarboxylic acid bis-[(4-phenylazo)-phenylimide] in α-modification, having an X-ray diffraction pattern exhibiting two strong lines at a double glancing angle of 5.1°, and 14.7°, a medium line at 10.5° and nine weak lines at 17.7°, 19.4°, 21.2°, 22.3°, 23.6°, 25.4°, 26.0°, 27.4° and 29.0°.

2. As a yellowish red pigment dye, perylene-3,4,9,10-tetracarboxylic acid bis-[(4-phenylazo)-phenylimide] in β-modification, having an X-ray diffraction pattern exhibiting two strong lines at a double glancing angle of 6.5° and 19.3°, a medium line at 13.5° and sixteen weak lines at 7.4°, 11.0°, 13.0°, 15.2°, 16.4°, 17.8°, 22.0°, 22.7°, 24.1°, 24.3°, 25.0°, 25.6°, 26.2°, 27.3°, 27.7° and 28.8°.

3. A process for producing perylene-3,4,9,10-tetracarboxylic acid bis-[(4-phenylazo)-phenylimide] in β-modification, which modification is characterized by an X-ray diffraction pattern exhibiting two strong lines as a double glancing angle of 6.5° and 19.3°, a medium line at 13.5° and sixteen weak lines at 7.4°, 11.0°, 13.0°, 15.2° 16.4°, 17.8°, 22.0°, 22.7°, 24.7°, 24.3°, 25.0°, 25.6°, 26.2°, 27.3°, 27.7° and 28.8° which process comprises contacting the α-modification of perylene-3,4,9,10-tetracarboxylic acid bis-[(4-phenylazo)-phenylimide], which modification is characterized by an X-ray diffraction pattern exhibiting two strong lines at a double glancing angle of 5.1°, and 14.7°, a medium line at 10.5° and nine weak lines at 17.7°, 19.4°, 21.2°, 22.3°, 23.6°, 25.4°, 26.0°, 27.4° and 29.0°, for one-half to two hours at 100°–150° C. with a liquid selected from the group consisting of dimethyl formamide, N-methyl pyrrolidone, and dimethyl sulfone in an amount of said liquid of five to twenty-five times the weight of said α-modification in a particle size of 4–10 microns until the mean particle size of the resultant β-modification is 1–4 microns.

References Cited

UNITED STATES PATENTS

| | | | |
|---|---|---|---|
| 2,715,127 | 8/1955 | Meier et al. | 260—281 |
| 3,043,843 | 7/1962 | Koch | 260—281 |

FOREIGN PATENTS

| | | |
|---|---|---|
| 837,326 | 6/1960 | Great Britain. |
| 1,223,392 | 2/1960 | France. |

OTHER REFERENCES

Mullin, "Crystallization," pp. 16–19 and 128–132, Buttersworth, London (1961).

CHARLES B. PARKER, *Primary Examiner.*

JOSEPH P. BRUST, *Examiner.*

R. J. FINNEGAN, F. D. HIGEL,
*Assistant Examiners.*

UNITED STATES PATENT OFFICE
CERTIFICATE OF CORRECTION

Patent No. 3,346,551　　　　　　　　　　　　　October 10, 1967

Ernst Anton

It is certified that error appears in the above identified patent and that said Letters Patent are hereby corrected as shown below:

Column 1, line 48, "blush" should read -- bluish --. Column 6, line 61, "as" should read -- at --; line 64, "24.7°" should read -- 24.1° --.

Signed and sealed this 23rd day of September 1969.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents